UNITED STATES PATENT OFFICE.

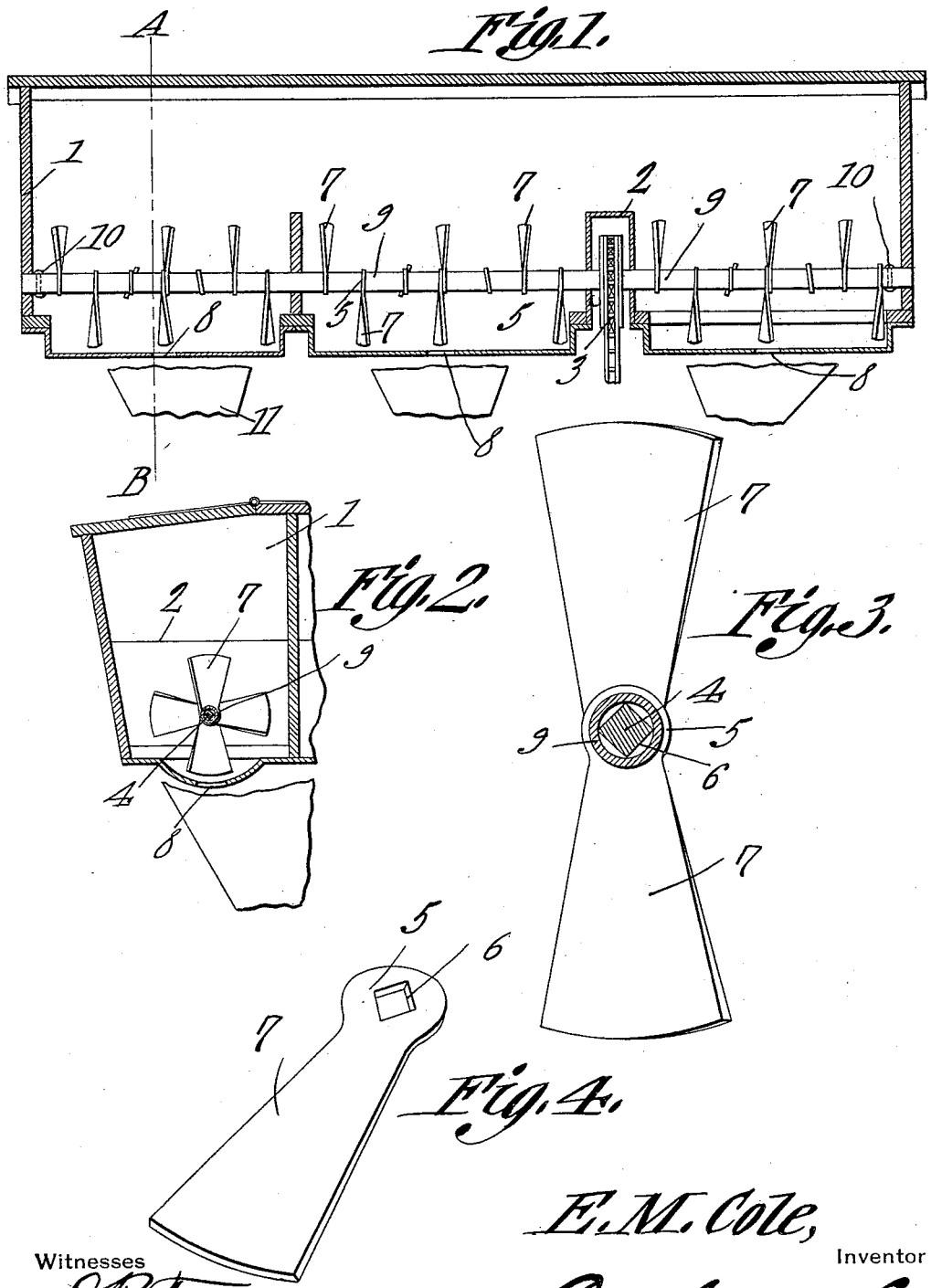

EUGENE MACON COLE, OF CHARLOTTE, NORTH CAROLINA.

AGITATOR AND FEEDER FOR FERTILIZER-DISTRIBUTERS.

1,104,247. Specification of Letters Patent. Patented July 21, 1914.

Application filed November 3, 1913. Serial No. 799,020.

*To all whom it may concern:*

Be it known that I, EUGENE M. COLE, a citizen of the United States, residing at Charlotte, in the county of Mecklenburg and State of North Carolina, have invented a new and useful Agitator and Feeder for Fertilizer-Distributers, of which the following is a specification.

This invention relates to agitators and feeders for fertilizer distributers, one of the objects of the invention being to provide a sectional structure of this type adapted to be mounted upon a single shaft so as to operate within a plurality of fertilizer containers, each unit of the structure being made up of detachably connected blades and spacing means coöperating to direct fertilizer toward a single opening arranged under the unit.

A further object is to provide a structure of this character particularly designed for use in connection with a machine designed to direct fertilizer simultaneously into two or more furrows.

A further object is to provide mechanism of this character the parts of which can be readily assembled and, when placed together, will not readily get out of order.

Another object is to provide a combined agitator and feeder which is cheap to manufacture and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a longitudinal section through a hopper having the present improvements combined therewith. Fig. 2 is a section on line A—B Fig. 1. Fig. 3 is an enlarged section through the combined agitator and feeder and showing the central members of one of the units. Fig. 4 is a detail view of one of the blades constituting a part of the mechanism.

Referring to the figures by characters of reference 1 designates a hopper which may be sub-divided into two or more compartments, the bottom of the hopper being provided with a raised portion 2 serving to divide two of the compartments and also serving as a housing for a sprocket 3 secured to an angular shaft 4. This shaft extends longitudinally of the hopper 1 and is journaled at its ends in the end walls of the hopper. Arranged on the shaft 4 is a series of units, one unit being provided for each compartment in the hopper. It will be seen that each unit is made up of a series of blades and of spacing elements. Each blade consists of an eye 5 in which is formed an angular opening 6 designed to receive the shaft 4, and extending from the eye is a wing 7 substantially segmental and which is slightly twisted to constitute a deflector.

Arranged at the center of each unit are two oppositely disposed wings 7 oppositely twisted so that, during the rotation of the unit, one wing will shift the material in one direction after which the other wing extending oppositely therefrom will shift the material in the opposite direction. These central wings are located directly above an outlet opening 8 formed in the bottom of the hopper. Additional wings 7 extend from the shaft at each side of the central wings, those wings at one side serving to direct the material in the hopper to the right or in the direction of the opening 8 while those wings at the other side of the central wings 7 are adapted to direct the material to the left toward said opening 8. The various wings may be held apart by spacing sleeves 9 made up of sections of gas pipe or the like.

In forming the agitator and feeder, the various parts making up the same are placed on the shaft 4 in proper succession after which the said parts are pressed tightly together and then secured by passing rivets 10 through the end sleeves 9. Thus the parts will be held securely clamped together and, as the eyes 5 fit snugly on the shaft 4 it will be seen that the blades will not shift relative to each other. When the agitator and feeder is rotated, the material within each of the compartments in the hopper 1 will obviously be directed toward the opening 8 in the bottom of said compartment, the central blades of each unit serving to shift the material back and forth over the opening, thus insuring the proper feeding of the material through the opening. As shown in Figs. 1 and 2, boots 11 may be arranged under the openings 8 to receive the material discharged from the hopper.

What is claimed is:—

1. A combined agitator and feeder including a shaft, and a unit carried by the shaft and including a pair of contacting oppositely extending, oppositely pitched sheet metal blades revoluble with the shaft for deflecting material in opposite directions successively, blades revoluble with the shaft at opposite sides of the said central blades for directing material toward the center of the unit, the blades of the central pair being in contact, and spacing means on the shaft and between the remaining blades.

2. A combined agitator and feeder including a shaft, and a plurality of units on the shaft, each unit including a centrally disposed pair of oppositely extending oppositely pitched blades contacting with each other at their inner ends and formed of sheet metal, and additional blades at each side of said central blades and disposed at angles to each other, those blades at the sides of the central blades being pitched to direct material toward the central blades, and spacing sleeves interposed between said side blades, all of the blades being held against rotation relative to the shaft.

3. A combined agitator and feeder including an angular shaft, and a plurality of units arranged on the shaft, each unit including a central pair of contacting oppositely disposed oppositely pitched segmental blades of sheet metal for directing material in opposite directions successively during the rotation of the shaft and blades, and a set of blades on the shaft at each side of the central blades, said sets of blades operating to direct material toward the central blades during the rotation of the shaft, all of the blades having angular eyes for the reception of the shaft, spacing sleeves interposed between the blades of the sets, additional sleeves mounted on the shaft beyond the outer ends of the outer units, and means extending through said last named sleeves and the shaft for holding the blades and spacing sleeves clamped together.

In testimony that I claim the foregoing as my own, I have hereto affixed my signature in the presence of two witnesses.

EUGENE MACON COLE.

Witnesses:
SELINA WILLSON,
I. E. SIMPSON.

---

Copies of this patent may be obtained for five cents each, by addressing the "Commissioner of Patents, Washington, D. C."